L. C. REESE.
BAKING OVEN.
APPLICATION FILED FEB. 1, 1915.
1,151,042.
Patented Aug. 24, 1915.
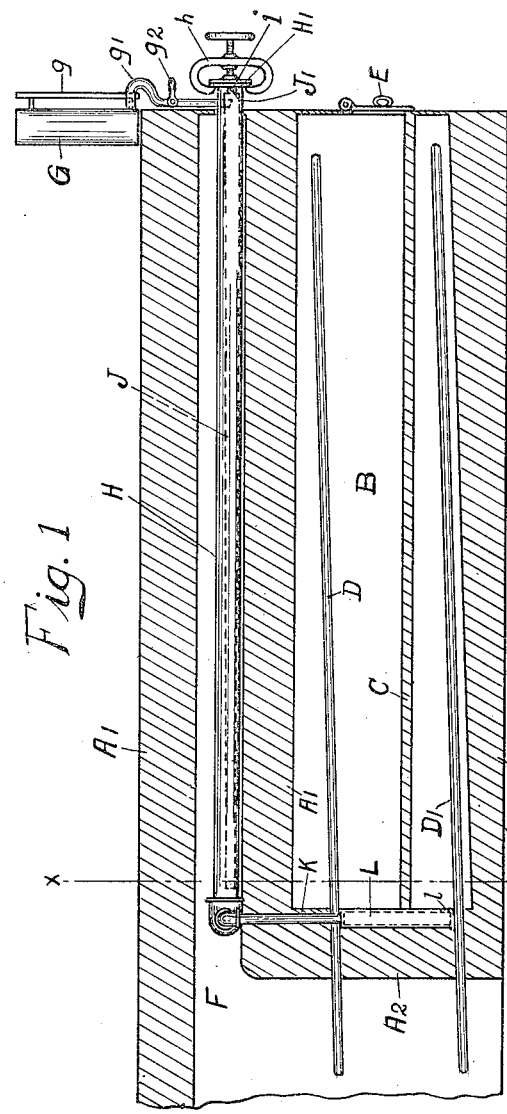
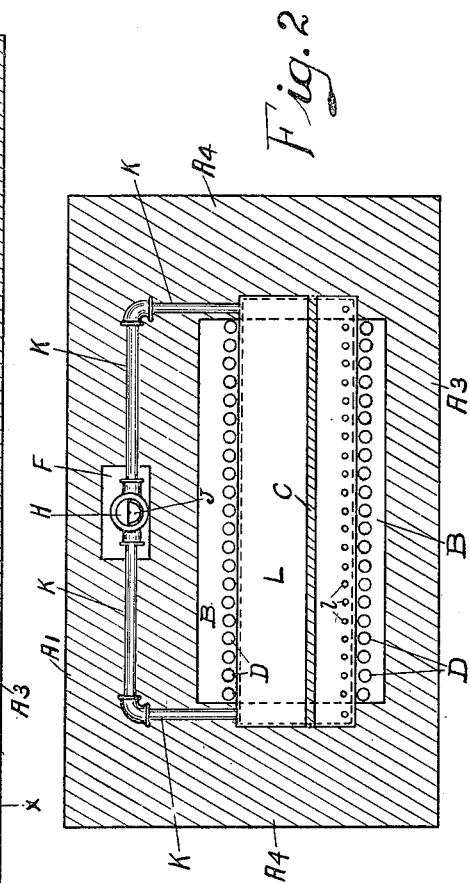
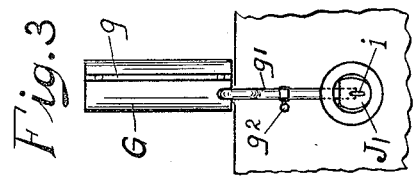
WITNESSES
Carl Kletscher
Eugene E. Schmierer
INVENTOR
Louis Charles Reese

UNITED STATES PATENT OFFICE.

LOUIS CHARLES REESE, OF SAGINAW, MICHIGAN, ASSIGNOR TO WERNER & PFLEIDERER CO., OF SAGINAW, MICHIGAN, A FIRM.

BAKING-OVEN.

1,151,042.  Specification of Letters Patent.  Patented Aug. 24, 1915.

Application filed February 1, 1915. Serial No. 5,554.

*To all whom it may concern:*

Be it known that I, LOUIS CHARLES REESE, residing in Saginaw, in the county of Saginaw and State of Michigan, have invented new and useful Improvements in Baking-Ovens, of which the following is a specification.

This invention relates to improvements in baking ovens in regard to the devices for introducing steam into the baking chamber of these ovens, and has for its object to perform this operation more effectively and economically and to obtain a better result in baking. To this end I employ for the reception of the water by the evaporation of which the steam to be introduced into the baking chamber is produced, a tank preferably of such a size as to hold an ample supply of water to produce the steam for one single batch of bread only, and which is provided with a gage or the like for measuring the quantity of water leaving it. This measuring tank is connected with the boiler, in which the water is evaporated, by a pipe provided with a stop-cock adapted to regulate the flow of the water from the tank into the boiler. This cock may also be a measuring cock indicating the quantity of water passing therethrough and may then take the place of the gage or other measuring device attached to the tank. By measuring the water to be evaporated as described, I am enabled to introduce into the baking chamber the exact amount of steam required for each batch of goods, whereby a better result in baking is obtained.

The boiler employed has preferably a very large surface in comparison to its volume, in order to accelerate the evaporation of the water, and is heated by arranging it in the flue leading the fire gases to the chimney or in the brick work heated by same, or by any other waste heat of the oven.

The boiler is provided with an inner vessel of thin metal open at the top and closed at both ends, the boiler and its inner vessel being arranged so as to allow readily to remove the latter from the former and to replace it therein after cleaning. The walls of the inner vessel are preferably as near as possible to the walls of the boiler in order to promote the evaporation of the water.

The pipe leading the water from the tank to the boiler is connected to the latter at such a point and in such a manner that the water drops into the inner vessel in which thus the impurities and residue contained in the evaporated water are retained. As soon as a quantity of these impurities and residue large enough to affect the evaporation unfavorably, has collected in the inner vessel, the latter is removed from the boiler, cleaned and then returned to its former place, whereupon the boiler, after having been closed, is at once ready for work again.

The capacity of the inner vessel of the boiler is preferably such as to enable it to hold amply the total quantity of water possibly contained in the measuring tank. In this way, if a mishap or mistake occurs, the water is prevented from overflowing into and flooding the other parts of the apparatus and the baking chamber.

The boiler is connected by a suitable pipe or pipes to a distributing device, for instance, a perforated box or tube, which, in order to heat the steam to the temperature of the baking chamber, is placed preferably in the hottest part of the oven. The openings through which the steam passes into the baking chamber, are preferably so arranged that the steam enters at the hottest points of the chamber, always taking care that the steam rushing into the same causes a rapid movement and interchange of the different gaseous fluids forming the atmosphere of the baking chamber, whereby an even temperature of the latter and of its contents is secured.

The accompanying drawing shows as example the application of the invention to a Perkins' steam tube oven.

Figure 1, represents a sectional elevation of those parts of the oven containing the invention and Fig. 2, a cross section on the line X—X; Fig. 3, is a front view of the measuring tank and of the boiler opened up.

$A_1$, $A_2$, $A_3$, $A_4$, represent the solid brick work and foundation of the oven; $A_1$ is the top, $A_2$, the wall between the baking chamber and the furnace (which latter is not shown as no parts of the invention are contained therein), $A_3$, the bottom and $A_4$, the side walls.

B is the baking chamber, and C the hearth on which the bread is baked.

D is the upper and $D_1$ the lower row of Perkins' steam tubes.

E is the door of the baking chamber B.

F represents the flue leading the spent fire gases from the furnace along the top, $A_1$, of the oven to the chimney.

G is the measuring tank containing the water to be evaporated, and is provided with the measuring gage $g$, and the pipe $g_1$ having the stop-cock $g_2$ attached thereto. The pipe $g_1$ is connected to the top of the boiler H, the end $H_1$ of which protrudes from the oven and is provided with the flange and screw closing arrangement $h$. The boiler H contains the inner vessel J fitting closely to the walls of H. The vessel J is, as shown, open in its upper part and closed at both ends. Its end part $J_1$ reaches well underneath the inlet into H of the pipe $g_1$ and is provided with the handle $i$ to draw it out of the boiler H after opening the flange $h$.

K are the tubes which lead the steam from the boiler $H_1$ to the distributing device L, which consists of a flat cast iron box closed from all sides provided at its lower end with numerous small holes, $l$, through which the steam enters the baking chamber.

The distribution box L is arranged between the upper and lower row of heating tubes D and $D_1$; its front side forms the back of the baking chamber which is thus efficiently protected against the always very fierce heat of the brick wall $A_1$ between the furnace and the baking chamber, while this heat is at the same time utilized for preheating the steam on its passage from the boiler H through K and L to the baking chamber B. The hot steam entering B through the holes $l$ at the bottom of B, is lighter than the mixture of gases, vapors, steam and air therein and, rushing upward and pressing forward to the front B, causes a continuous current and interchange in the atmosphere of B from the bottom to the top and from the back to the front and vice versa, whereby the temperatures of the baking chamber and its contents are kept uniform.

I claim:—

1. In devices for introducing steam into the baking chamber of baking ovens, the combination of a measuring tank, a boiler heated by the waste heat of the oven, and a steam distributing device arranged at the hottest point of the baking chamber.

2. In devices for introducing steam into the baking chamber of baking ovens, the combination of a measuring tank, a boiler containing an easily removable inner vessel, and a steam distributing device arranged in the baking chamber.

3. In devices for introducing steam into the baking chamber of baking ovens, the combination of a measuring tank, a boiler containing an easily removable inner vessel and heated by the waste heat of the oven, and a steam distributing device arranged in the baking chamber.

4. In devices for introducing steam into the baking chamber of baking ovens, the combination of a measuring tank, a boiler containing an easily removable inner vessel and heated by the waste heat of the oven, and a steam distributing device arranged at the hottest point of the baking chamber.

5. In devices for introducing steam into the baking chamber of baking ovens, the combination of a water tank, a measuring cock attached to the pipe leading the water from the tank to the boiler, a boiler heated by the waste heat of the oven and a steam distributing device arranged at the hottest point of the baking chamber.

6. In devices for introducing steam into the baking chamber of baking ovens, the combination of a water tank, a measuring cock attached to the pipe leading the water from the tank to the boiler, a boiler containing an easily removable inner vessel and heated by the waste heat of the oven, and a steam distributing device arranged at the hottest point of the baking chamber.

7. In devices for introducing steam into the baking chamber of baking ovens, the combination of a measuring tank, a boiler containing an easily removable inner vessel and arranged in the flue leading the spent fire gases to the chimney, and a steam distributing device arranged at the hottest point of the baking chamber.

8. In devices for introducing steam into the baking chamber of Perkins' steam tube ovens, the combination of a measuring tank, a boiler containing an easily removable inner vessel and heated by the waste heat of the oven, and a steam distributing box arranged in the wall between the furnace and the baking chamber, its front side forming the back of the baking chamber and provided with holes opening into same.

LOUIS CHARLES REESE.

Witnesses:
CARL HETSCHER,
EUGENE E. SCHMIERER.

Copies of this patent may be obtained for five cents each, by addressing the "Commissioner of Patents, Washington, D. C."